United States Patent
Yu et al.

(10) Patent No.: US 8,558,475 B2
(45) Date of Patent: Oct. 15, 2013

(54) LAMP CIRCUIT OF LIGHT EMITTING DEVICE

(75) Inventors: Chung-Hung Yu, Taipei (TW); Ta-Wei Chao, Taipei (TW); Chien-Nan Pan, Taipei (TW)

(73) Assignee: Advanced-Connectek Inc., Taipei (TW)

( * ) Notice: Subject to any disclaimer, the term of this patent is extended or adjusted under 35 U.S.C. 154(b) by 245 days.

(21) Appl. No.: 12/979,491

(22) Filed: Dec. 28, 2010

(65) Prior Publication Data

US 2012/0112664 A1    May 10, 2012

(30) Foreign Application Priority Data

Nov. 8, 2010   (TW) ................................ 99138403 A

(51) Int. Cl.
*H05B 41/16*   (2006.01)

(52) U.S. Cl.
USPC ........ 315/247; 315/209 R; 315/224; 315/291; 315/307

(58) Field of Classification Search
USPC .......... 315/247, 246, 224, 225, 291, 307–311
See application file for complete search history.

(56) References Cited

U.S. PATENT DOCUMENTS

| 2010/0225251 A1* | 9/2010 | Maruyama | 315/307 |
| 2011/0109249 A1* | 5/2011 | Liu et al. | 315/307 |

* cited by examiner

*Primary Examiner* — Tuyet Thi Vo
(74) *Attorney, Agent, or Firm* — C. G. Mersereau; Nikolai & Mersereau, P.A.

(57) ABSTRACT

The invention provides a lamp circuit of a light emitting device, which comprises a capacitor, a rectification unit, a current limiting unit, and a light emitting device. The capacitor is connected to the two lamp contacts of the lamp holder of the electrical ballast to change the resonant frequency of the resonant circuit of the electrical ballast. The rectification unit is connected to the capacitor, and utilized to rectify a sine-wave voltage to a direct current voltage. The current limiting unit is connected to the rectification unit, outputting a direct current corresponding to the direct current voltage. The light emitting device is connected to the current limiting unit and the rectification unit to generate a light source. With the invention, the light emitting device can be installed directly in a lamp holder of a conventional fluorescent lamp.

18 Claims, 4 Drawing Sheets

LAMP CIRCUIT OF LIGHT EMITTING DEVICE

FIELD OF THE INVENTION

The present invention relates to a lamp circuit of a light emitting device, and particularly to a lamp circuit of a light emitting device that utilizes a capacitor to change the resonant frequency of a resonant circuit in a typical electrical ballast.

BACKGROUND

With research and development in the last few decades, manufacturing technology has improved to a point that light emitting devices, such as light emitting diodes (LEDs), have the advantages of small size, no pollution, energy saving, long life span, and high efficiency of light emission. In recent years they are widely used in a variety of applicable fields, and gradually become the light source used in general fluorescent lamps. Currently the structure of a LED module disposed in a transparent tube is utilized as the lamp structure of the light emitting devices, and the terminal design of the typical fluorescent lamp is used as the terminal of the lamp.

Currently the fluorescent lamps widely provided in the typical buildings are the conventional fluorescent lamps, and conventional electrical ballasts are provided in the circuitry to generate high resonant frequency and provide sufficiently high activation voltage. However, when a LED is installed in the typical fluorescent lamp, the high activation voltage created by the resonance leads to collapsing and burning of the LED, and thus the LED is not compatible to be installed in the typical fluorescent lamp with the conventional electrical ballast. When an LED is to be installed, the conventional electrical ballast in the fluorescent lamp must be removed, and the circuitry of the lamp must be re-disposed to generate light. This creates inconvenience to the customers and a barrier of energy saving and green energy.

Therefore, the inventor has a need to invent a lamp circuit of a light emitting device to solve the aforementioned problems of incompatibility of the light emitting devices and the conventional electrical ballasts.

SUMMARY OF THE INVENTION

An objective of the present invention is to provide a lamp circuit of a light emitting device, which allows a light emitting element to be directly installed in a lamp holder of a conventional fluorescent lamp having an electrical ballast, wherein the electrical ballast has a ballast rectification unit, a power factor corrector, a resonance converter, a inductor, and a ballast capacitor, wherein one end of the ballast capacitor is electrically connected with the first lamp contact and the other end of the ballast capacitor is electrically connected with the second lamp contact. The lamp holder has a first lamp contact and a second lamp contact. The lamp circuit comprises a capacitor, a rectification unit, a current limiting unit, and a light emitting element.

The capacitor is electrically connected between the first lamp contact and the second lamp contact to change the resonant frequency of the resonant circuit of the electrical ballast, such that the electrical ballast does not generate high frequency resonance.

The rectification unit is electrically connected to the capacitor, and utilized to rectify a sine-wave voltage outputted from the electrical ballast to generate a direct current voltage in order to output the operation voltage compatible to the light emitting element.

The current limiting unit is connected to the rectification unit for generating a direct current corresponding to the direct current voltage to drive the light emitting element to generate a light source.

According to the invention, the light emitting device can be installed directly in a lamp holder of a conventional fluorescent lamp, and be compatible to the electrical ballast. With the utilization of the lamp circuit of a light emitting device of the invention, there is no need to purchase additional lamp or to remove the electrical ballast and re-dispose the circuitry of the lamp.

DETAILED DESCRIPTION OF THE INVENTION

The techniques employed by the present invention to achieve the foregoing objectives and the effects thereof are described hereinafter by way of examples with reference to the accompanying drawings.

Figure 1:
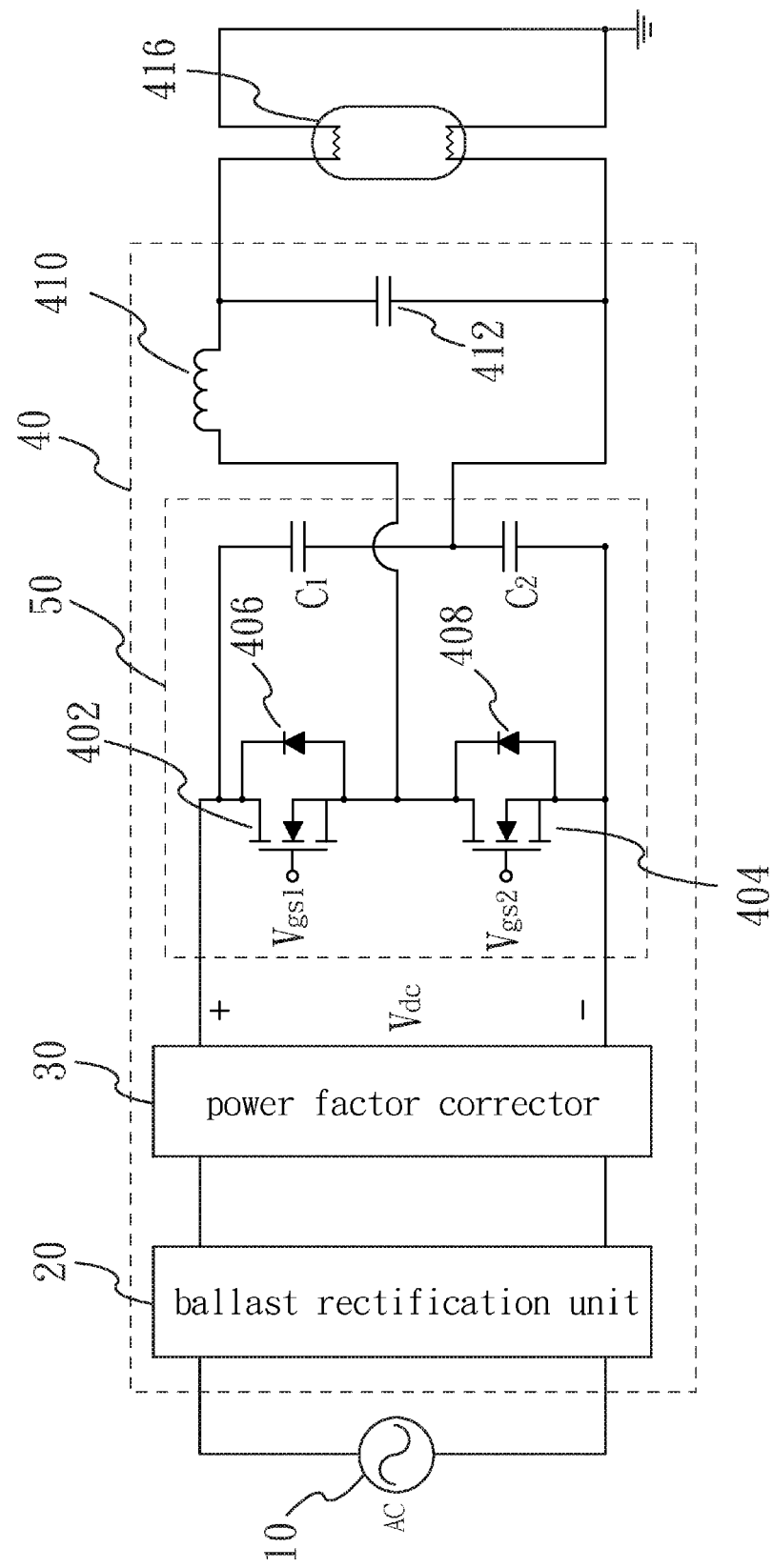
FIG. 1 is a schematic view of the circuit structure of a conventional series resonance electrical ballast.

Referring to FIG. 1, which is a schematic view of the circuit structure of a conventional series resonance electrical ballast. In the figure an alternating current power source 10 outputs an alternating current voltage to a ballast rectification unit 20, and the rectified direct current voltage is fed to a power factor corrector 30. It is a direct current to direct current transforming circuit capable of controlling switches in correspondence to loading of different power such that the energy storing circuit saves or releases energy in order to change the input power and the current wave shape. With proper operation procedures, the wave shape and the amplitude of the output current can be accurately controlled, thus achieving power factor correcting and voltage stabilization. Currently a power factor corrector has its operating frequency at the range of several dozens to hundreds kHz, which makes harmonic distortion to be suppressed to almost nonexistence and the power factor to approach 1, and allows the input power and loading to change in a relatively large range.

The direct current voltage output by the power factor corrector 30 is fed to a resonance converter 50 of an electrical ballast 40, which comprises a first N-type metallic oxide semiconductor field effect transistor (NMOSFET) 402, a second NMOSFET 404, a first converter capacitor C1 and a second converter capacitor C2. The first NMOSFET 402 is in a parallel connection to a first diode 406, and the second NMOSFET 404 is in a parallel connection to a second diode 408. The first converter capacitor C1 is connected between the drain of the first NMOSFET 402 and the second converter capacitor C2, and the second converter capacitor C2 is connected between the first converter capacitor C1 and the source of the second NMOSFET 404. The two NMOSFETs 402, 404 of the resonance converter 50 are utilized as switches, which are alternatively driven to conductance by a first NMOSFET gate signal Vgs1 and a second NMOSFET gate signal Vgs2 to generate a square wave voltage to the resonant circuit. The first converter capacitor C1 and the second converter capacitor C2 perform as filters and have high capacitance such that they work as constant voltage sources. The duty cycles of the first NMOSFET gate signal Vgs1 and the second NMOSFET gate signal Vgs2 are generally designed to be 50% symmetrical, and a short deadtime must exist between the first NMOSFET gate signal Vgs1 and the second NMOSFET gate signal Vgs2 to avoid conductance of both switches that leads to short circuit. When the first NMOSFET 402 is in conductance, an input voltage Vdc exists between the two ends of the second NMOSFET 404, and when the second NMOSFET 404 is in conductance, an input voltage Vdc exists between the two ends of the first NMOSFET 402. The deadtime between the driving signals of the two switches can be utilized to release energy in the first converter capacitor C1 and the second converter capacitor C2, and each of the switches will be in conductance only when the voltage between the two ends of the switches drops to zero, thus zero-voltage switching is achieved and efficiency is enhanced.

Therefore, the resonance converter 50 transforms the direct current voltage output by the power factor corrector 30 to high frequent square wave voltage and loading through active switching of the two NMOSFETs 402, 404. The fluorescent lamp 416 serves as the loading of the electrical ballast 40, outputting a high frequent voltage as the input power of a resonant circuit by high frequency switching of the resonance converter 50. The inductor 410 and the ballast capacitor 412 is equivalent to the resonant circuit. The resonant circuit serves in two functional ways: one is to provide the activation voltage of the fluorescent lamp 416 when the fluorescent lamp 416 is turned on, and the other is to provide proper lamp current when the fluorescent lamp 416 is in stable operation.

Generally, the capacitance of the electrical ballast 40 is about 33-47 nF, and the inductance is about 0.2-0.3 mH. According to the formula of a frequency-inductive reactance relationship of an LC-series connection resonant circuit, which is shown below, the series connection resonant frequency f is about 50 kHz. In comparison, general operation frequency of a typical electrical ballast 40 is about 20 kHz to 70 kHz.

$$f = \frac{1}{2\pi\sqrt{LC}}$$

Figure 2:
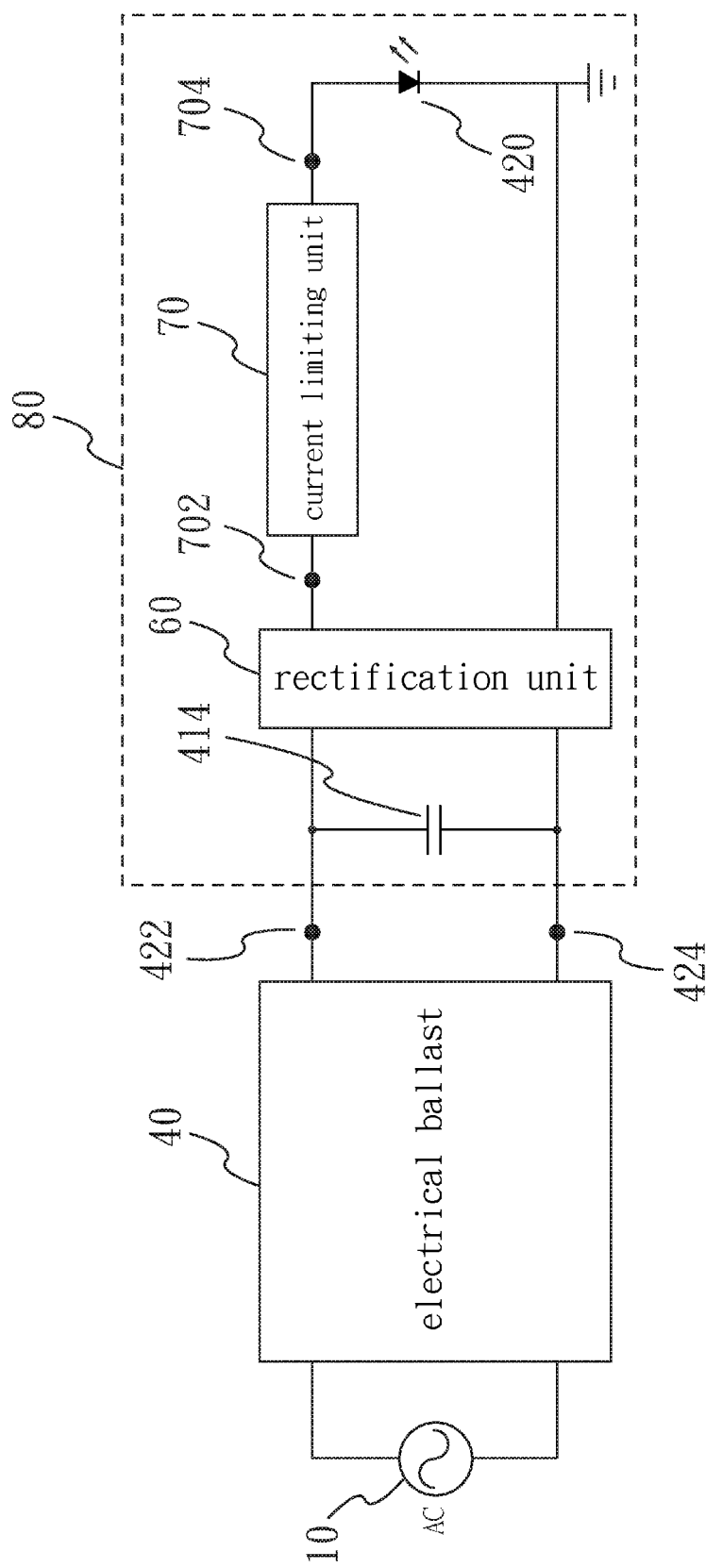
FIG. 2 is a schematic view of a lamp circuit of a light emitting device according to a first embodiment of the invention.

Referring to FIG. 2, which is a schematic view of a lamp circuit of a light emitting device according to a first embodiment of the invention. In the figure, the circuitry and operation of the electrical ballast 40 is the same as the one in FIG. 1, and detailed description thereof is hereafter omitted. The difference in the embodiment exists in that a lamp circuit 80 of a light emitting device of the invention is in substitution of the fluorescent lamp 416.

The lamp circuit 80 of the invention comprises a capacitor 414, a rectification unit 60, a current limiting unit 70, and a light emitting element 420. The capacitor 414 is connected between the first lamp contact 422 and the second lamp contact 424 of the lamp holder of the electrical ballast 40 to change the equivalent impedance of the resonant circuit in the electrical ballast 40 so that no resonance condition exists. In the embodiment, the equivalent capacitance of the resonant circuit is obtained by the connecting the electrical ballast capacitor 412 with the capacitor 414 in parallel, and the equivalent capacitance is greater than the capacitance of the electrical ballast capacitor 412; thus the resonant frequency of the resonant circuit in the electrical ballast 40 is changed. In this way, the switching frequency of the resonance converter 50 and the resonant frequency of the resonant circuit are different.

The rectification unit 60 is connected between the first lamp contact 422 and the second lamp contact 424, as shown in FIG. 2, and the rectification unit 60 is in a parallel connection to the capacitor 414. The rectification unit 60 rectifies a sine-wave voltage of the electrical ballast to a direct current voltage. The rectification unit 60 can be a bridge rectifier comprising a plurality of diodes, and each of the diodes is a high frequency diode, to support the resonant frequency.

An input terminal 702 of the current limiting unit 70 is connected to the rectification unit 60, and an output terminal 704 of the current limiting unit 70 is connected to the light emitting element 420. The current limiting unit 70 generates a direct current corresponding to the direct current voltage output by the rectification unit 60. The other end of the light emitting element 420 is connected to the rectification unit 60, generating a light source corresponding to the direct current received. The light emitting element 420 can be at least one of an organic light emitting diodes (OLED), a light emitting diode (LED) and an electroluminescent light emitting device, and there can be a plurality of light emitting diodes.

In this embodiment, the capacitor 414 and the ballast capacitor 412 are in parallel connection, and the equivalent capacitance of the electrical ballast 40 is greater than the capacitance of the electrical ballast capacitor 412. According to the above-mentioned formula of the frequency-inductive reactance relationship, the resonant frequency of the resonant circuit will be reduced in comparison to the original value. With the lamp circuit 80 of the light emitting device of the invention, the switching frequency of the resonance converter 50 and the resonant frequency of the resonant circuit are different so that no resonance condition exists. Thus, the operation voltage compatible to the light emitting element 420 can be output without collapsing and burning of the light emitting element 420.

Figure 3:
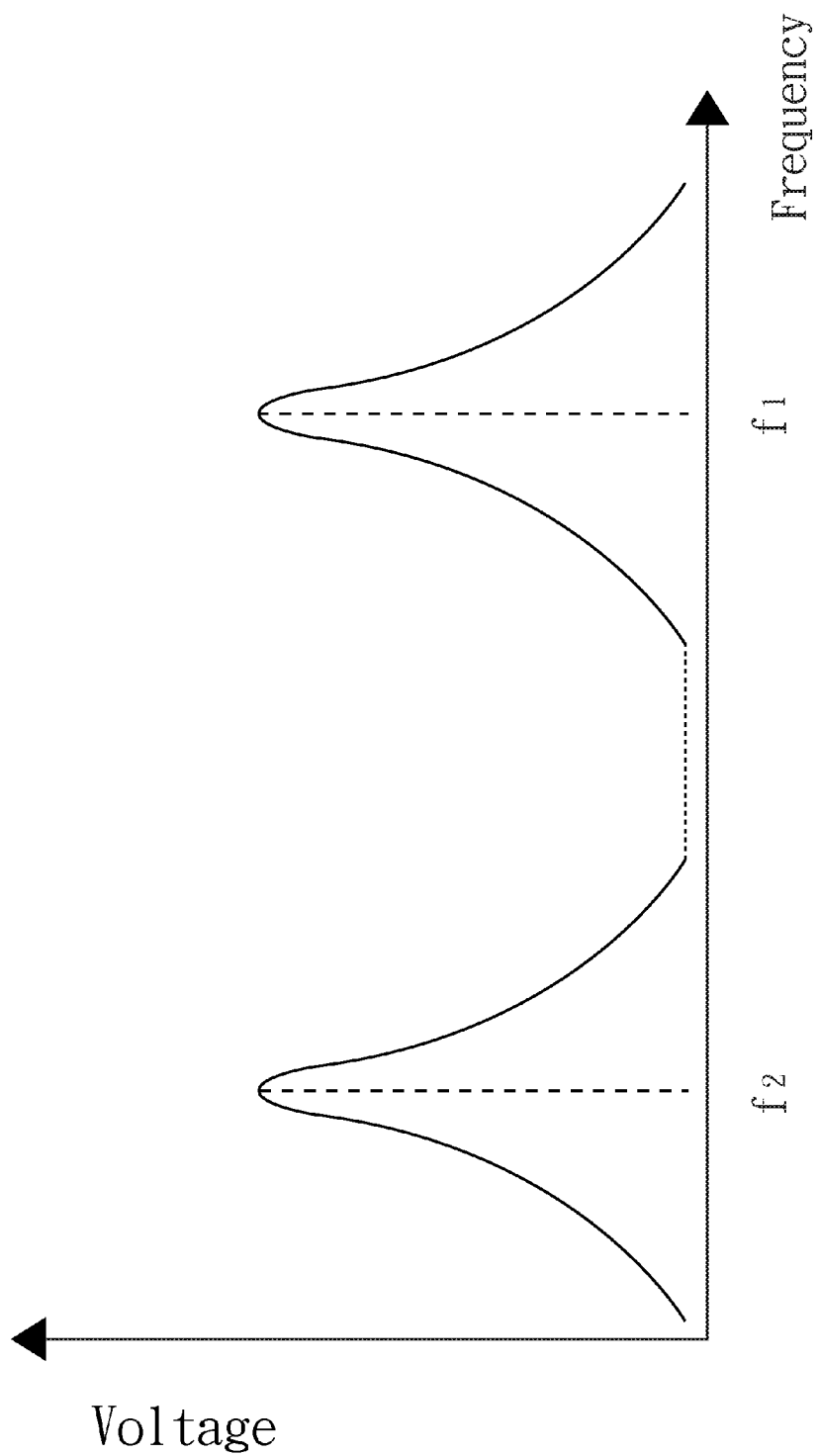
FIG. 3 is a schematic chart of the frequency-voltage relationship of a series resonant circuit.

Referring to FIG. 3, which is a schematic chart of the frequency-voltage relationship of a series resonant circuit. In the figure, f1 is the resonant frequency of the conventional electrical ballast 40 with a typical fluorescent lamp 416 as the loading, and f2 is the resonant frequency of the lamp circuit of the light emitting device of the invention in a parallel connection to the electrical ballast 40. The lamp circuit 80 of the invention comprises a capacitor 414, and the capacitor 414 is in a parallel connection to the ballast capacitor 412 of the electrical ballast 40. Thus, the equivalent capacitance obtained by connecting the capacitor 414 with the ballast capacitor 412 in parallel is greater than the capacitance of the electrical ballast capacitor 412. According to the above-mentioned formula of the frequency-inductive reactance relationship, the resonant frequency f2 of the resonant circuit will be reduced in comparison to the original value f1, f2<f1, as shown in the figure. Thus, the operation frequency of the lamp circuit 80 of the light emitting device of the invention does not overlap with the operation frequency of the electrical ballast 40.

Figure 4:
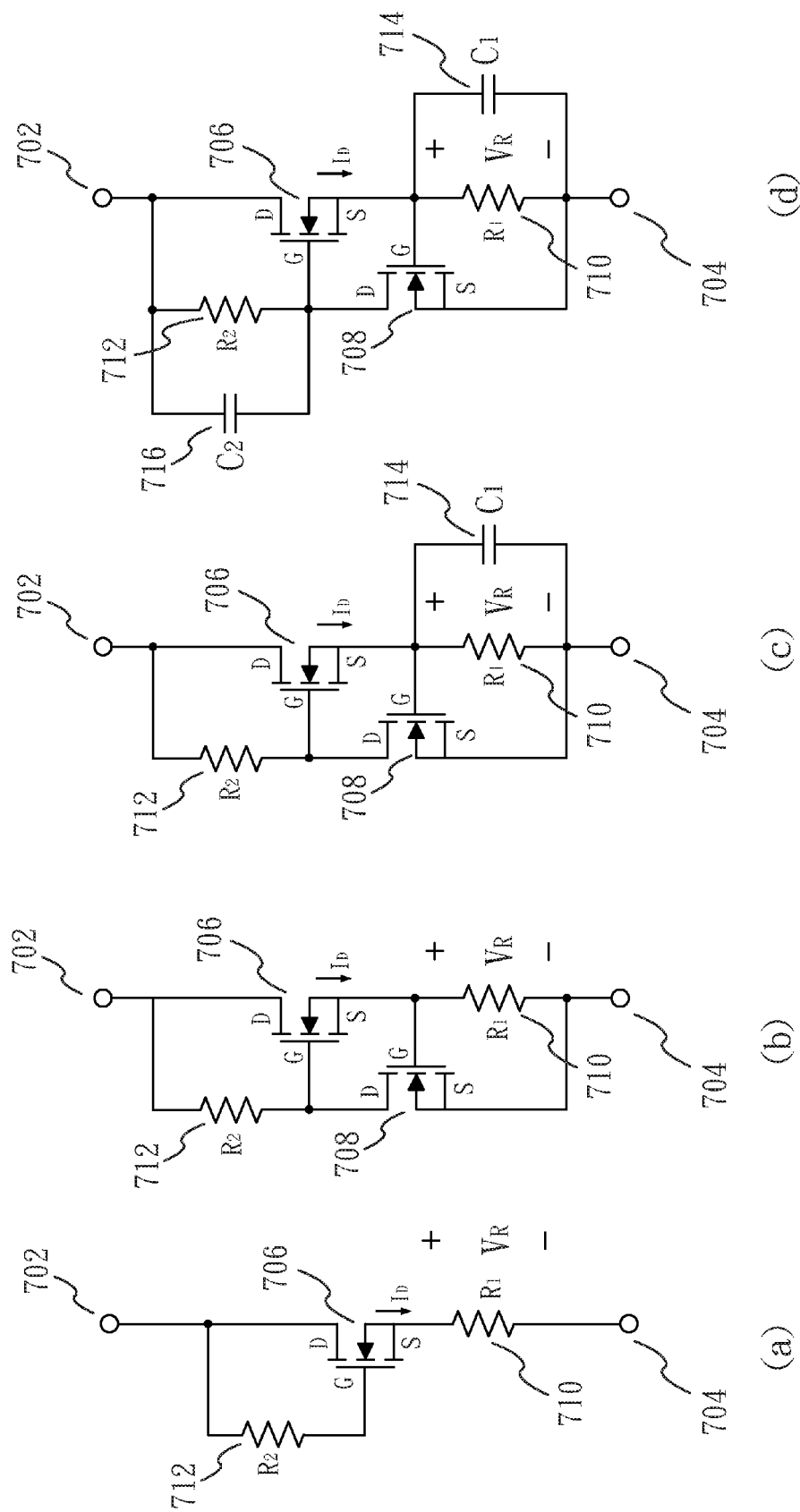
FIG. 4a is a schematic view of a current limiting unit according to a first embodiment of the invention.
FIG. 4b is a schematic view of a current limiting unit according to a second embodiment of the invention.
FIG. 4c is a schematic view of a current limiting unit according to a third embodiment of the invention.
FIG. 4d is a schematic view of a current limiting unit according to a fourth embodiment of the invention.

Referring to FIG. 4a, which is a schematic view of a current limiting unit according to a first embodiment of the invention. As shown in the figure, the current limiting unit comprises: a first transistor 706 comprising a first drain D, a first gate G and a first source S, the first drain D connected to the input terminal 702 of the current limiting unit, and the first gate G connected to the first drain D; a first resistance 710 connected between the first source S and the output terminal 704 of the current limiting unit; and a second resistance 712 connected between the first gate G and the input terminal 702 of the current limiting unit. The input terminal 702 of the current limiting unit is connected to the rectification unit 60, and the output terminal 704 of the current limiting unit is connected to the light emitting device 420. The first transistor 706 receives a voltage rectified by the rectification unit 60 such that the first transistor 706 is in conductance. The source S outputs a stabilized current $I_D$ corresponding to the voltage drop between the gate G and the source S, and the stabilized current $I_D$ output from the source S flows through the first resistance 710 to generate a voltage VR to control the gate voltage of the first transistor 706, thus achieving current limiting.

Referring to FIG. 4b, which is a schematic view of a current limiting unit according to a second embodiment of the invention. The current limiting unit comprises: a first transistor 706 comprising a first drain D, a first gate G and a first source S, the first drain D connected to the input terminal 702 of the current limiting unit, and the first gate G connected to a second resistance 712; a first resistance 710 connected between the first source S and the output terminal 704 of the current limiting unit; a second transistor 708 comprising a second drain D, a second gate G and a second source S, the second drain D connected to the first gate G, the second gate G connected to the first source S, and the second source S connected to the output terminal 704 of the current limiting unit; and the second resistance 712 connected between the first gate G and the input terminal 702 of the current limiting unit. The input terminal 702 of the current limiting unit is connected to the rectification unit 60, and the output terminal 704 of the current limiting unit is connected to the light emitting device 420. The second resistance 712 serves as a current source connected to an outside power source, and outputs a current corresponding to the voltage across the second resistance 712. The outside power source is a rectified direct current source. The drain D of the first transistor 706 is connected to the outside power source, and the source S outputs a stabilized current ID corresponding to the voltage drop between the gate G and the source S. The second transistor 708 controls the voltage of the gate G of the first transistor 706 according to the voltage across the first resistance 710, and the second transistor 708 is a voltage controlling transistor. As known by the persons of ordinary skills in the art, when the voltage of the outside power source increases, the current flowing through the drain D and the source S of the first transistor 706 increases, so that the first transistor 706 can be viewed as a resistance controlled by the voltage between the drain D and the source S of the first transistor 706. Therefore, when the voltage of the first resistance 710 increases due to increased current $I_D$ and the increased voltage between the gate G and the source S of the second transistor 708, the resistance of the second transistor 708 is greatly reduced. Thus, by reducing the voltage of the gate G of the first transistor 706, the current $I_D$ between the drain D and the source S of the first transistor 706 is limited, and current limiting can be achieved.

Referring to FIG. 4c, which is a schematic view of a current limiting unit according to a third embodiment of the invention. The current limiting unit comprises: a first transistor 706 comprising a first drain D, a first gate G and a first source S, the first drain D connected to the input terminal 702 of the current limiting unit, and the first gate G connected to a second resistance 712; a first resistance 710 connected between the first source S and the output terminal 704 of the current limiting unit; a second transistor 708 comprising a second drain D, a second gate G and a second source S, the second drain D connected to the first gate G, the second gate G connected to the first source S, and the second source S connected to the output terminal 704 of the current limiting unit; the second resistance 712 connected between the first gate G and the input terminal 702 of the current limiting unit; and a first regulating capacitor 714 connected in parallel to the first resistance 710. The input terminal 702 of the current limiting unit is connected to the rectification unit 60, and the output terminal 704 of the current limiting unit is connected to the light emitting device 420. In this embodiment, the circuitry and operation is the same as the one in FIG. 4b, and detailed description thereof is hereafter omitted. The difference in this embodiment exists in the first regulating capacitor 714 connected in parallel to the first resistance 710. The first regulating capacitor 714 stores power energy when the first transistor 706 is in conductance, thus providing a reverse bias to the first resistance 710 to reduce the voltage across the first resistance 710. Therefore, the voltage between the gate G and the source S of the second transistor 708 is reduced, and the current flowing through the first transistor 706 can be adjusted.

Referring to FIG. 4d, which is a schematic view of a current limiting unit according to a fourth embodiment of the invention. The current limiting unit comprises: a first transistor 706 comprising a first drain D, a first gate G and a first source S, the first drain D connected to the input terminal 702 of the current limiting unit, and the first gate G connected to a second resistance 712; a first resistance 710 connected between the first source S and the output terminal 704 of the current limiting unit; a second transistor 708 comprising a second drain D, a second gate G and a second source S, the second drain D connected to the first gate G, the second gate G connected to the first source S, and the second source S connected to the output terminal 704 of the current limiting unit; the second resistance 712 connected between the first gate G and the input terminal 702 of the current limiting unit; a first regulating capacitor 714 connected in parallel to the first resistance 710; and a second regulating capacitor 716 connected in parallel to the second resistance 712. The input terminal 702 of the current limiting unit is connected to the rectification unit 60, and the output terminal 704 of the current limiting unit is connected to the light emitting device 420. In this embodiment, the circuitry and operation is the same as the one in FIG. 4c, and detailed description thereof is hereafter omitted. The difference in this embodiment exists in the second regulating capacitor 716 connected in parallel to the second resistance 712. The first regulating capacitor 716 stores power energy when the first transistor 706 is in conductance, thus providing a reverse bias to the second resistance 712 to reduce the voltage across the second resistance 712. Therefore, the voltage between the gate G and the drain D of the first transistor 706 is reduced, and the current flowing through the second transistor 708 can be adjusted.

The preferred embodiments of the present invention have been disclosed in the examples. However, the examples should not be construed as a limitation on the actual applicable scope of the invention, and as such, all modifications and alterations without departing from the spirits of the invention and appended claims shall remain within the protected scope and claims of the invention.

What is claimed is:

1. A lamp circuit of a light emitting device for allowing a light emitting element directly installed in a fluorescent lamp holder which comprises an electrical ballast, a first lamp contact, and a second lamp contact, wherein one end of the electrical ballast is electrically connected with the first lamp contact and the other end of the electrical ballast is electrically connected with the second lamp contact, comprising:

a capacitor electrically connected between the first lamp contact and the second lamp contact;

a rectification unit electrically connected respectively to the first lamp contact and the second lamp contact, wherein the rectification unit receives an alternating current voltage transmitted by the lamp holder and rectifies the alternating current voltage to generate a direct current voltage;

a current limiting unit electrically connected to the rectification unit and generating a direct current corresponding to the direct current voltage; and the light emitting element electrically connected between the current limiting unit and the rectification unit for generating a light source corresponding to the direct current.

2. A lamp circuit according to claim 1, wherein the electrical ballast comprises a ballast rectification unit, a power factor corrector, a resonance converter, a inductor, and a ballast capacitor and one end of the ballast capacitor is electrically connected with the first lamp contact and the other end of the ballast capacitor is electrically connected with the second lamp contact.

3. A lamp circuit according to claim 2, wherein the inductor and the ballast capacitor is equivalent to a resonant circuit, and the capacitor is utilized to change an equivalent impedance or a resonant frequency of the resonant circuit.

4. A lamp circuit according to claim 3, wherein an equivalent capacitance of the resonant circuit is obtained by connecting the capacitor with the ballast capacitor, and the equivalent capacitance is greater than capacitance of the ballast capacitor.

5. A lamp circuit of a light emitting device for applying to a lamp holder which comprises an electrical ballast, a first lamp contact, and a second lamp contact, wherein one end of the electrical ballast which has a resonant frequency is electrically connected with the first lamp contact and the other end of the electrical ballast is electrically connected with the second lamp contact, comprising:

a capacitor electrically connected between the first lamp contact and the second lamp contact, wherein the capacitor is utilized to change the resonant frequency of the electrical ballast;

a rectification unit electrically connected respectively to the first lamp contact and the second lamp contact, wherein the rectification unit receives an alternating current voltage transmitted by the lamp holder and rectifies the alternating current voltage to generate a direct current voltage;

a current limiting unit electrically connected to the rectification unit and generating a direct current corresponding to the direct current voltage; and the light emitting element electrically connected between the current limiting unit and the rectification unit for generating a light source corresponding to the direct current.

6. A lamp circuit of a light emitting device according to claim 5, wherein the electrical ballast has a ballast rectification unit, a power factor corrector, a resonance converter, a inductor, and a ballast capacitor, wherein one end of the ballast capacitor is electrically connected with the first lamp contact and the other end of the ballast capacitor is electrically connected with the second lamp contact.

7. A lamp circuit of a light emitting device according to claim 6, wherein the inductor and the ballast capacitor is equivalent to a resonant circuit and the capacitor is utilized to change a equivalent impedance of the resonant circuit.

8. A lamp circuit of a light emitting device according to claim 7, wherein an equivalent capacitance of the resonant circuit is obtained by connecting the capacitor with the ballast capacitor, and the equivalent capacitance is greater than a capacitance of the ballast capacitor.

9. A lamp circuit of a light emitting device for allowing a light emitting element directly installed in a fluorescent lamp holder which has an electrical ballast, a first lamp contact, and a second lamp contact, wherein the electrical ballast comprises a ballast rectification unit, a power factor corrector, a resonance converter, a inductor, and a ballast capacitor, wherein one end of the ballast capacitor is electrically connected with the first lamp contact and the other end of the ballast capacitor is electrically connected with the second lamp contact, comprising:

a capacitor electrically connected between the first lamp contact and the second lamp contact;

a rectification unit electrically connected respectively to the first lamp contact and the second lamp contact, wherein the rectification unit receives an alternating current voltage transmitted by the lamp holder and rectifies the alternating current voltage to generate a direct current voltage;

a current limiting unit electrically connected to the rectification unit for generating a direct current corresponding to the direct current voltage; and the light emitting element electrically connected between the current limiting unit and the rectification unit for generating a light source corresponding to the direct current.

10. A lamp circuit of a light emitting device according to claim 9, wherein the rectification unit is a bridge rectifier which comprises a plurality of high frequency diodes.

11. A lamp circuit of a light emitting device according to claim 9, wherein the light emitting element is one of an organic light emitting diode (OLED), a light emitting diode (LED), and an electroluminescent light emitting device.

12. A lamp circuit of a light emitting device according to claim 9, wherein the light emitting element comprises a plurality of light emitting diodes.

13. A lamp circuit of a light emitting device according to claim 9, wherein the inductor and the ballast capacitor is equivalent to a resonant circuit and the capacitor is utilized to change an equivalent impedance or a resonant frequency of the resonant circuit.

14. A lamp circuit of a light emitting device according to claim 9, wherein an equivalent capacitance of the resonant circuit is obtained by connecting the capacitor with the ballast capacitor in parallel and the equivalent capacitance is greater than a capacitance of the ballast capacitor.

15. A lamp circuit of a light emitting device according to claim 9, wherein the current limiting unit comprises a first transistor having a first drain, a first gate, and a first source, wherein the first drain is electrically connected to the rectification unit, and the first gate is electrically connected to the first drain, a first resistance is electrically connected between the first source and the light emitting element, and a second resistance is electrically connected between the first gate and the rectification unit.

16. A lamp circuit of a light emitting device according to claim 15, wherein the current limiting unit further comprises a second transistor having a second drain, a second gate, and a second source, wherein the second drain is electrically connected to the first gate, the second gate is electrically connected to the first source, and the second source is electrically connected to the light emitting element.

17. A lamp circuit of a light emitting device according to claim 16, further comprising a first regulating capacitor is electrically connected between the first source and the light emitting element.

18. A lamp circuit of a light emitting element according to claim 17, further comprising a second regulating capacitor is electrically connected between the first gate and the rectification unit.

* * * * *